June 1, 1937.  G. E. RUTISHAUSER  2,082,720
PROCESS AND APPARATUS FOR THE MANUFACTURE OF
TUBULAR STRUCTURES OF ARTIFICIAL MATERIALS
Filed March 1, 1934

Inventor:
Georg Eugen Rutishauser
Attorneys:
Bailey & Larson

Patented June 1, 1937

2,082,720

UNITED STATES PATENT OFFICE 2,082,720

PROCESS AND APPARATUS FOR THE MANUFACTURE OF TUBULAR STRUCTURES OF ARTIFICIAL MATERIALS

Georg Eugen Rutishauser, Basel, Switzerland, assignor to Lonza Elektrizitatswerke und Chemische Fabriken Aktiengesellschaft, Basel, Switzerland, a Swiss company Application March 1, 1934, Serial No. 713,600
In Germany March 10, 1933

4 Claims. (Cl. 18—14)

This invention relates to the manufacture of tubular structures made of artificial materials.

According to the invention, tubular structures made of artificial materials and having a high titre, for example 500 to 50,000 denier, are manufactured by extruding a highly viscous, for example doughy or pasty, mass of artificial material in a heated condition through an annular nozzle under high pressure and simultaneously introducing a gas into the hollow space.

The process is suitable for the manufacture of the most varied kinds of tubular or pipe-like artificial structures, for example for the manufacture of artificial straw, materials for plaited work, drinking straws, insulating tubes, tubular mouthpieces for cigarettes and tubes for chemical and physical purposes and so forth.

The starting materials for use in the process are cellulose derivatives such as cellulose ester, cellulose ether, particularly cellulose acetate as well as other artificial substances, such as, for example, artificial resins, condensation products, polymerization products and so forth, and in some cases mixtures of a number of artificial substances. It is preferable to work-up artificial substances which themselves have a low degree of viscosity, such, for example, as cellulose acetate of low viscosity, since such substances have a relatively smaller resistance when the paste manufactured from them is extruded through narrow nozzles than artificial substances which are by nature highly viscous.

The manufacture of the paste to be extruded can be effected with the aid of volatile solvents, diluents, softening media and the like. Other additional substances, for example hardening resins, dyes, pigments and the like, can be incorporated in the mass. The kind of starting materials and assistants employed, and the composition of the paste for extrusion and so forth depend on the kind of product to be produced and the purpose for which it is to be used. For manufacturing small flexible tubes, for example of artificial straw for plaiting, and for the manufacture of small insulating tubes and the like, suitable amounts of softening media are added. For manufacturing drinking straws and like products the addition of softening media is omitted or they are added only in as small quantities as possible. For improving the stiffness of the structures hardening resins, for example copal resin, may be added. In order to facilitate the uniform extrusion through the nozzle the plastic mass is heated to a temperature of for example 50 to 100° C., and is extruded through the nozzle under high pressure, for example under a pressure of 100 to 500 atmospheres, preferably 150 to 400 atmospheres, a gas, preferably air, being simultaneously blown into the interior of the structure. In many cases it has also proved advantageous to introduce at the same time a thread or several threads into the hollow space of the tubular structure which is being formed.

Experiments in which the paste to be extruded was manufactured hot or was heated after manufacture and introduced into the pressure cylinder gave unsatisfactory results. When working in this manner an undesired evaporation of the easily volatile solvent took place and further alterations in the composition of the mass to be extruded occurred and these alterations produced troublesome effects in continuous operation and caused irregularities in the quality of the products. The attempt was then made to heat the paste to be extruded for the first time in the pressure cylinders. This method of working also gave rise to great difficulties, since, owing to the pasty nature of the mass and its poor heat conductivity a uniform heating throughout the entire mass could only be obtained with great difficulty. In this case also irregularities in operation occurred and the quality of the products was not uniform.

According to the present invention the process is as follows: The highly viscous mass is first highly compressed, and it is then heated to the desired temperature, for example 50 to 100° C., and then extruded through the nozzle.

A further feature of the invention consists in that the mass is brought in stages to the desired high pressure.

The process may take place for example in the following manner. The pasty mass is introduced at the ordinary temperature into a hydraulic press and is there compressed to a predetermined pressure, for example 70 to 100 atmospheres. The mass is then compressed to the desired final pressure, for example 250 to 300 atmospheres, by means of a valveless precision pump, and while this pressure is maintained is pressed through the heating chamber and extruded through the nozzle.

The hydraulic press is preferably provided with two pressure cylinders which are alternately connected to the precision pump. Any interruption in the continuous flow of the mass through the annular nozzle is thereby avoided when filling or changing the cylinders. On its passage through the pressure apparatus to the nozzle the paste to be extruded preferably moves in an upward direction. By this means the access of ground water to the paste is prevented and easy accessibility of the parts of the apparatus, particularly the nozzle, is ensured.

It has also proved advantageous to subject the paste to a filtering operation on its passage to the nozzle, for example by providing between the heating apparatus and the nozzle a filter, which may be capable of being heated, and may be for example in the form of a fine-meshed sieve or sieves. In consequence of the previous heating of the mass to be extruded, the mass can pass through the fine filter with comparative ease. By this means any impurities or thickened portions which may be present or have been formed in the mass are broken up or held back and the reliability of the apparatus and the uniformity of the product are improved. The solidification of the structures emerging from the annular nozzle is preferably effected in a horizontal plane and not in a vertical direction as hitherto usual. By this means any pull or tension or the like, such as usually hitherto occurs owing to the weight of the structure when drying it in a vertical position, is avoided. It has been found that even when moving horizontally any undesired deformation of the tubular structure which is still soft can be entirely eliminated.

The drying takes place slowly using temperatures which are below the temperature at which the solvent or mixture of solvents present in the paste boils. Drying temperatures of about 20 to 30° C. have generally been found to be very suitable. Comparative experiments have proved that the result of quick drying at higher temperatures was that brittle structures, which sometimes contained bubbles, were produced, whereas when the drying process was carried out under the moderate conditions indicated the products produced were of a faultless character.

The drying track should in general be at least 25 and preferably 50 to 500 metres in length. In order to reduce the size of the drying apparatus, the tubular structures can be carried over rollers for reversing their direction of travel. Experiments have proved that when reversing rollers are employed of which the diameter amounts to at least 50 times, and preferably 100 to 200 times, the diameter of the structure to be dried, any damage, such as undesired deformations, bends and the like, is avoided.

The speed at which the structures are delivered should be in general at least 20 metres per minute, but the speed is preferably considerably greater, for example 60 to 500 metres per minute. It is indeed known in the manufacture of thin filaments, of artificial silk for example, to work with great speeds of delivery, but it is a novel and progressive step to work with great speeds of delivery when manufacturing tubular structures of coarse titre, for example artificial straw.

For manufacturing material of about 500 denier for plaiting, speeds of about 400 metres per minute, for example, have proved suitable, while for thick structures, for example structures of about 9,000 denier, speeds of about 60 metres per minute have been found suitable. Structures of about 50,000 denier, for example, can be delivered at speeds of about 20 metres per minute for example.

The process of manufacture can be carried out in such a way that the production, including the drying and any further treatment of the tubular structures, such as, for example, cutting into lengths, packing and the like, takes place in a continuous operation, and in some cases in such a way that, during its entire travel in the course of manufacture, for example until it is cut and packed, the structure does not come into contact with the hands of the worker. The tubular structures can also be further treated, for example, in such a way that they are thickened or turned over or widened at the ends, for example, as is necessary in the case of cigar mouth-pieces. Treatments of this kind can be carried out, for example, by causing the structures to swell at the places to be treated by the action of a swelling agent and then pressing the swollen or softened parts over cold mandrels or by subjecting the structures without previous swelling to a treatment with heated and, if necessary, rotary mandrels.

In the manufacture of structures, such as drinking straws, which must be made as straight as possible, it is preferable to subject the finished cut structures, which may still have a moisture content of about 10%, to a subsequent drying with their axes positively held straight, for example by drying them in bundles which are tied together, for example by means of a rubber band or in a container having a cover which is loaded by means of a weight. In many cases also it is advantageous, depending on the nature of the starting materials employed, to wash the finished structures in order to obtain products which are entirely free from taste and smell.

Apparatus for carrying out the process is illustrated by way of example in the accompanying drawing, in which:—

Figure 1:
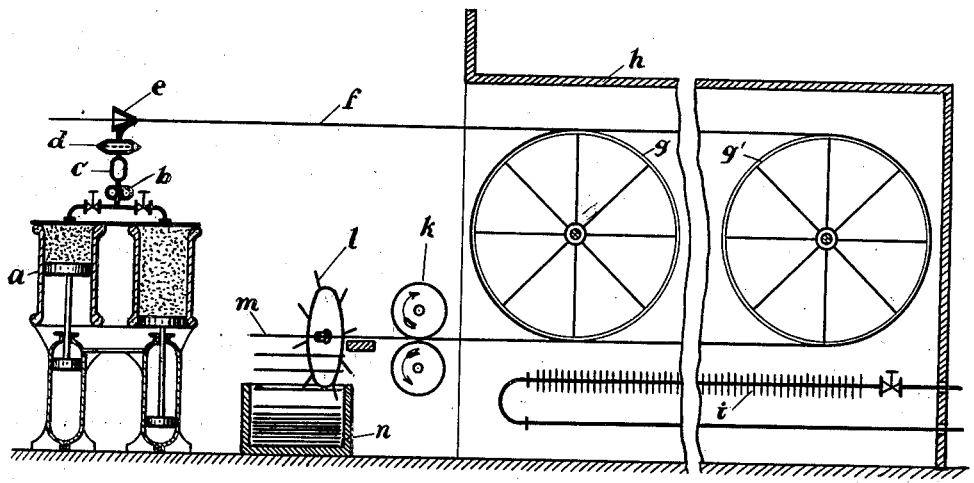
Figure 1 is a diagrammatic view of one form of apparatus.
Figure 2:
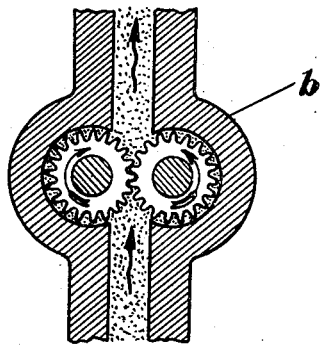
Figure 2 shows a section through a rotary toothed wheel pump.

Referring to the drawing, the mass to be extruded is introduced cold into the press $a$ and is compressed in this to the desired pressure of, for example, 70 atmospheres. The mass under pressure is then brought to a high pressure of, for example, 250 atmospheres by means of the toothed wheel precision pump $b$ and is pressed through the heater $c$ in which it is heated to the desired temperature. The heated mass is pressed through the sieve-like filter $d$ into the annular nozzle $e$, while simultaneously a current of air is introduced through the mouth-piece of the nozzle into the tubular structure $f$ emerging from the nozzle. The tubular structure $f$ is carried in a horizontal direction over rollers $g$ and $g'$ for reversing the direction of motion and is dried on its passage through the chamber $h$ which is heated by the heater $i$. On leaving the chamber $h$ the structure passes through the delivery rollers $k$ and is delivered by them to the cutting device $l$ whereby it is divided into smaller pieces which fall into the container $n$.

*Examples*

1. An approximately 30% solution of cellulose acetate in acetone containing about 27% of a softening agent and 2% of titanium white is worked up by means of the apparatus illustrated in the drawing to form structures which can be used for plaiting. The mass is compressed by means of the hydraulic press $a$ to a pressure of 70 atmospheres, and then brought to a pressure of about 250 atmospheres by means of the toothed wheel precision pump $b$. On passing through the heating device $c$ the mass is heated up to a temperature of about 70° C. The heated mass is then pressed through the flat filter $d$ and the rectangularly bent nozzle e at a pressure of about 200 atmospheres and a temperature of about 70° C. Air at a small pressure of about 200 millimetres of water is simultaneously blown through the core of the nozzle e and, further, a cotton thread is led through the opening in the nozzle. The structure which emerges from the nozzle is moved in a horizontal direction and during this movement is dried at a temperature of about 25° C. The length of the drying track amounts to about 100 metres and the speed of delivery to about 400 metres per minute. The titre of the finished structure is about 600 denier and its diameter 0.5 millimetres.

2. An approximately 50% solution of cellulose acetate in acetone is worked up with the aid of the pressing and drying device of the kind shown in the drawing, for example, to form drinking straws. The paste in this case is brought to a pressure of about 60 atmospheres at the first compression stage and to about 200 atmospheres at the second. After this the mass is heated and after passing the filter is extruded from the nozzle at a temperature of about 80° C. and a pressure of about 120 atmospheres. The temperature of the drying chamber is about 30° C. and the drying track about 400 metres long, and the speed of delivery about 64 metres per minute. For horizontally guiding the tubular structure through the drying chamber, nine rollers, the diameter of which is about 800 millimetres, are employed. At the end of the drying track the dried tubular structure is cut by means of a cutting device into lengths of about 200 millimetres and the lengths fall directly into a box in which they are packed. The titre of the tubes is about 10,000 denier, the diameter about 4 millimetres. The tubes are quite straight, and free from smell and germs. The rate of production is 300 pieces per minute.

The air or the gas can be introduced in known manner into the tubular structure produced through an internal bore in the nozzle and with or without pressure, and if desired simultaneously with a thread.

I claim:—

1. A process for the production of tubular structures having a high titre of at least 500 deniers which consists in subjecting a mass containing an organic cellulose derivative and at most 70% of a solvent for same to a pressure of at least 100 atmospheres without heating, heating the compressed mass to a temperature of about 50-100° C. while maintaining it under the said pressure, then extruding the mass into the atmosphere through an annular orifice while introducing gas into the cavity thus formed and slowly drying the tubular object to solidify the same.

2. Apparatus for the production of tubular structures having a high titre of at least 500 deniers from a mass of pasty to doughy consistency at ordinary temperature, containing an organic cellulose derivative and a solvent for same, comprising, in combination, a hydraulic press having a piston which moves upwardly to compress the mass, a heater connected to said press and an annular nozzle connected to said heater and opening into the atmosphere, the mass passing successively from said press through said heater and nozzle.

3. Apparatus for the production of tubular structures having a high titre of at least 500 deniers from a mass of pasty to doughy consistency at ordinary temperature, containing an organic cellulose derivative and a solvent for same, comprising, in combination a hydraulic press having a piston which moves upwardly to compress the mass, a valveless precision pump connected to said press for further increasing the pressure on the mass, a heater connected to said pump, and an annular nozzle connected to said heater and opening into the atmosphere, the mass passing successively from said press through said pump, heater and nozzle.

4. Apparatus for the production of tubular structures having a high titre of at least 500 deniers from a mass of pasty to doughy consistency at ordinary temperature, containing an organic cellulose derivative and a solvent for same, comprising, in combination, a hydraulic press having a piston which moves upwardly to compress the mass, a heater connected to said press, and an annular nozzle connected to said heater and opening into the atmosphere, the mass passing successively from said press through said heater and nozzle, and means for transporting the tubular object formed in a horizontal direction from the nozzle while said object is being solidified by the evaporation of the solvent.

GEORG EUGEN RUTISHAUSER.